(12) United States Patent
Lee et al.

(10) Patent No.: US 11,559,058 B2
(45) Date of Patent: Jan. 24, 2023

(54) SYNERGISTIC ANTIMICROBIAL EFFECTS AMONG ROSEMARY EXTRACT, CULTURED DEXTROSE AND BUFFERED VINEGAR

(71) Applicant: KALAMAZOO HOLDINGS, INC., Kalamazoo, MI (US)

(72) Inventors: Andrew Lee, Portage, MI (US); Amber Beckett, Kalamazoo, MI (US); Poulson Joseph, Kalamazoo, MI (US); Sloane Stoufer, Sunderland, MA (US); Alessandra Pham-Mondala, Kalamazoo, MI (US)

(73) Assignee: KALAMAZOO HOLDINGS, INC., Kalamazoo, MI (US)

( * ) Notice: Subject to any disclaimer, the term of this patent is extended or adjusted under 35 U.S.C. 154(b) by 317 days.

(21) Appl. No.: 17/021,310

(22) Filed: Sep. 15, 2020

(65) Prior Publication Data
US 2021/0084910 A1 Mar. 25, 2021

Related U.S. Application Data

(60) Provisional application No. 62/903,166, filed on Sep. 20, 2019.

(51) Int. Cl.
| | |
|---|---|
| *A01N 65/22* | (2009.01) |
| *A01N 37/02* | (2006.01) |
| *A01N 43/16* | (2006.01) |
| *A23L 2/44* | (2006.01) |
| *A23L 3/3463* | (2006.01) |
| *A01N 63/20* | (2020.01) |
| *A01N 65/44* | (2009.01) |

(52) U.S. Cl.
CPC ............. *A01N 65/22* (2013.01); *A01N 37/02* (2013.01); *A01N 43/16* (2013.01); *A23L 2/44* (2013.01); *A23L 3/34635* (2013.01); *A23V 2002/00* (2013.01)

(58) Field of Classification Search
CPC ........ A01N 65/22; A01N 37/02; A01N 43/16; A01N 63/20; A01N 65/44; A23L 2/44; A23L 3/34635; A23V 2002/00
See application file for complete search history.

(56) References Cited

U.S. PATENT DOCUMENTS

| | | |
|---|---|---|
| 6,383,508 B1 | 5/2002 | Messina |
| 9,883,689 B2 | 2/2018 | Perumalla et al. |
| 10,271,557 B2 | 4/2019 | Thomas et al. |

(Continued)

FOREIGN PATENT DOCUMENTS

| | | |
|---|---|---|
| WO | WO2002017729 | 3/2002 |
| WO | WO2019108064 | 6/2019 |

OTHER PUBLICATIONS

Search Report for PCT/US2020/050854 dated Oct. 26, 2020.
(Continued)

*Primary Examiner* — Trevor Love
(74) *Attorney, Agent, or Firm* — Hueschen and Sage

(57) ABSTRACT

The present invention relates to novel synergistic compositions comprising known "clean-label" antimicrobial substances as well as processes for stabilizing food substances against typical food borne spoilage microorganisms and/or pathogens. It is a further object of the invention to provide novel combinations of "clean label" antimicrobials which may be employed in such a process.

6 Claims, 8 Drawing Sheets

Antimicrobial testing of rosemary essential oil (RO), cultured dextrose (CD) and the combination of RO and CD. Growth of S. Typhimurium was measured by the change in optical density (600nm). Percentage on bar indicates growth inhibition.

(56) References Cited

U.S. PATENT DOCUMENTS

| | | |
|---|---|---|
| 10,327,463 B2 | 6/2019 | Sheehan et al. |
| 2009/0087502 A1 | 4/2009 | Jameson |
| 2012/0251700 A1 | 10/2012 | Hofing |
| 2016/0000134 A1 | 1/2016 | Sandra et al. |

OTHER PUBLICATIONS

Golden, et al., Journal of Food Protection, 77.10 (2014):1787-1793.
McDonnell, et al., Journal of Food Protection, 76.8 (2013):1366-1376.

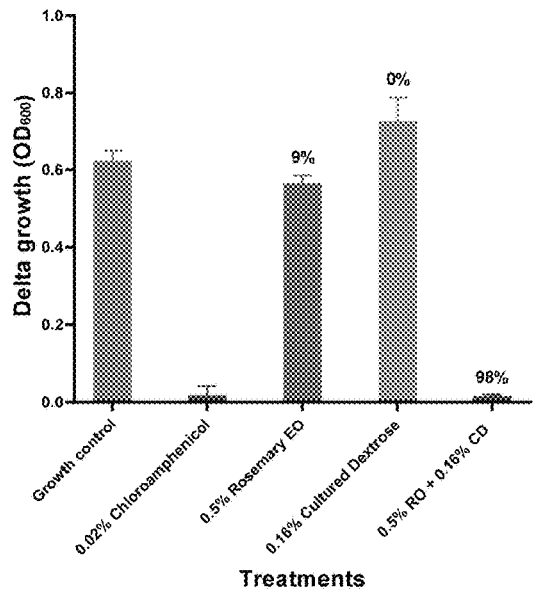

Figure 1. Antimicrobial testing of rosemary essential oil (RO), cultured dextrose (CD) and the combination of RO and CD. Growth of S. Typhimurium was measured by the change in optical density (600nm). Percentage on bar indicates growth inhibition.

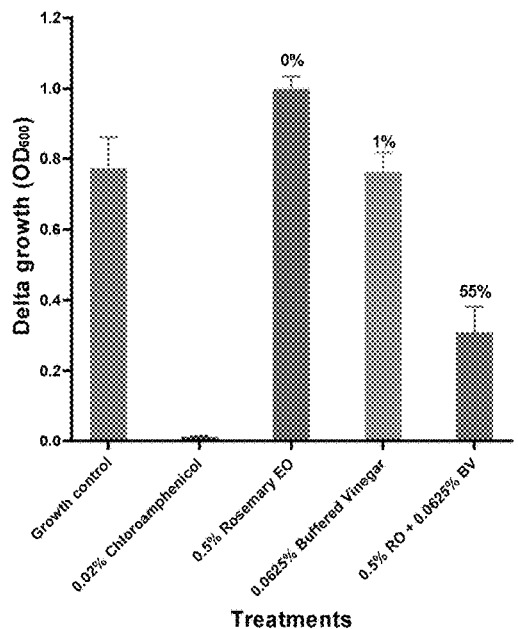

Figure 2. Antimicrobial testing of rosemary essential oil, buffered vinegar (BV) and the combination of RO and BV. Growth of S. Typhimurium was measured by the change in optical density (600nm). Percentage on bar indicates growth inhibition.

Figure 3. Antimicrobial testing of cultured dextrose, buffered vinegar and the combination of CD and BV. Growth of *S.* Typhimurium was measured by the change in optical density (600nm). Percentage on bar indicates growth inhibition.

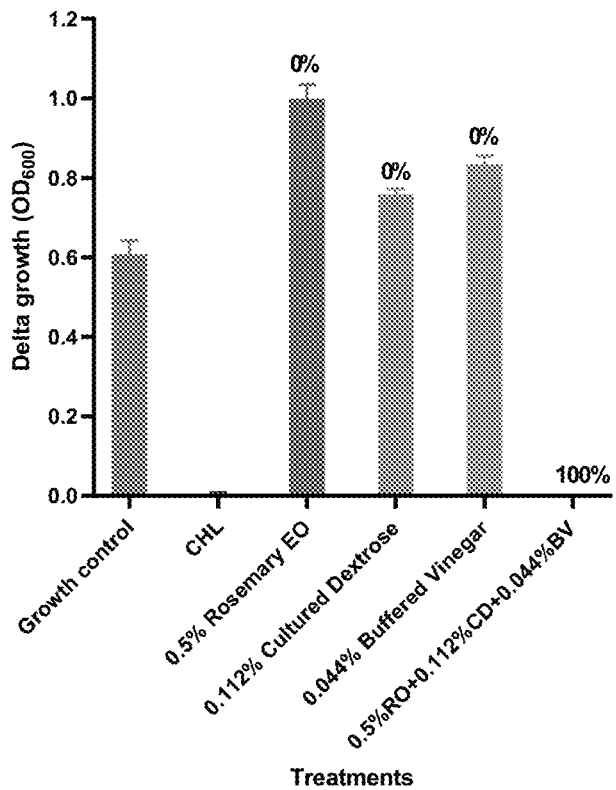
Figure 4. Antimicrobial testing of rosemary essential oil, cultured dextrose, buffered vinegar (BV) and the combination of the three compounds. Growth of *S.* Typhimurium was measured by the change in optical density (600nm). Percentage on bar indicates growth inhibition.

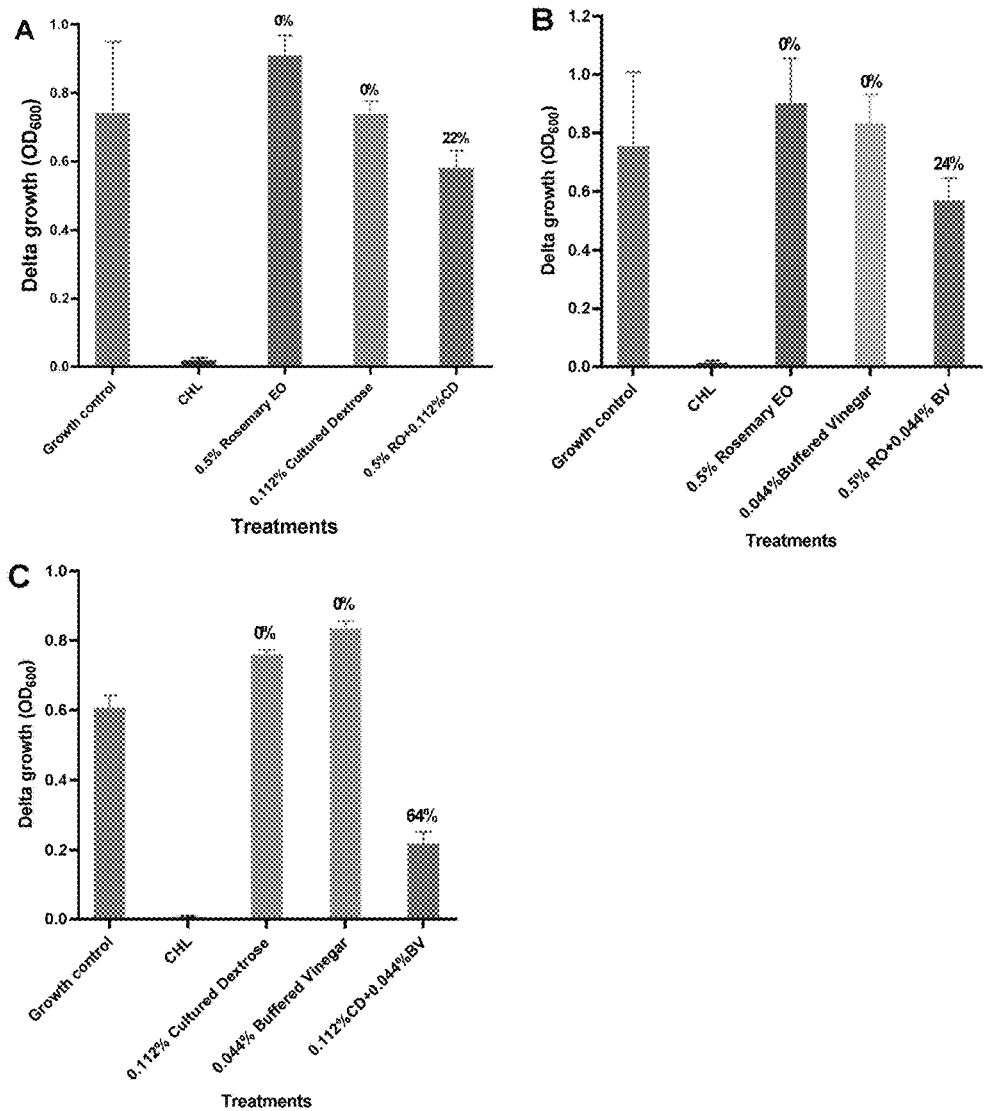

Figure 5. Antimicrobial testing of A) rosemary essential oil, cultured dextrose, and the combination of RO and CD. B) rosemary essential oil, buffered vinegar, and the combination of RO and BV. C) cultured dextrose, buffered vinegar, and the combination of cultured CD and BV. Growth of S. Typhimurium was measured by the change in optical density (600nm). Percentage on bar indicates growth inhibition.

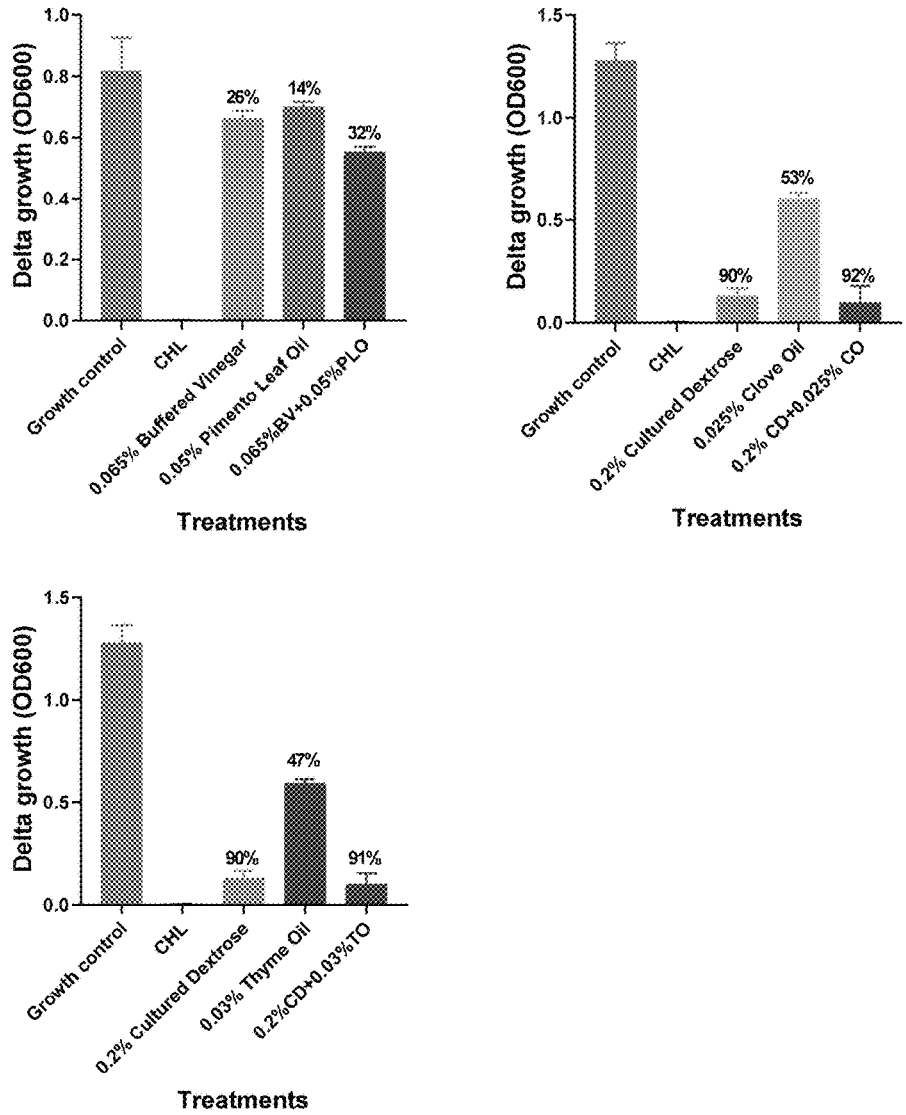
Figure 6. Antimicrobial testing of A) buffered vinegar, pimento leaf oil (PO), and the combination of BV and PO. B) cultured dextrose, clove oil (CO), and the combination of CD and CO. C) cultured dextrose, thyme oil, and the combination of CD and TO. Growth of S. Typhimurium was measured by the change in optical density (600nm). Percentage on bar indicates growth inhibition.

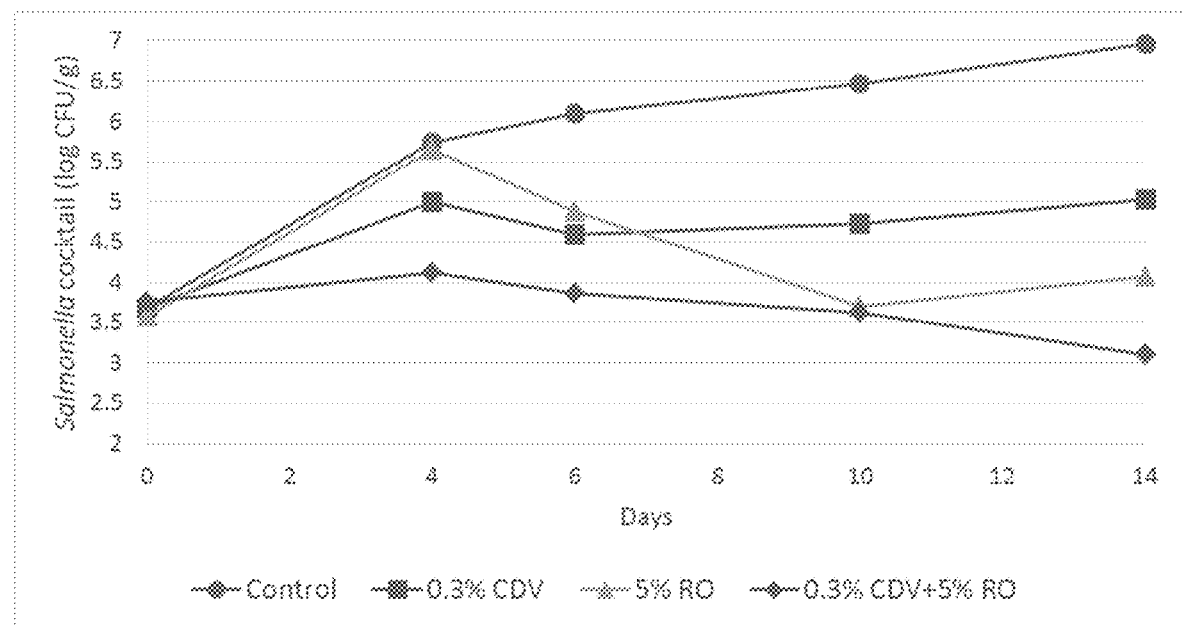
Figure 7. Synergistic antimicrobial activity of encapsulated rosemary essential oil, cultured dextrose, and buffered vinegar against *Salmonella* cocktail in Fresh Ground Turkey

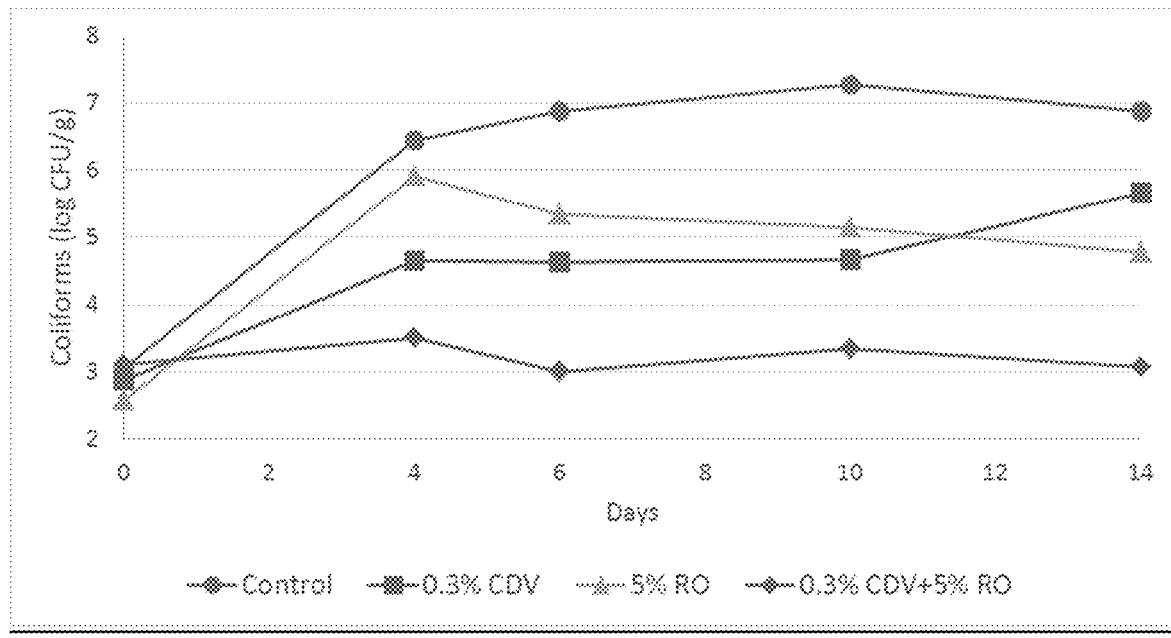
Figure 8. Synergistic antimicrobial activity of encapsulated rosemary essential oil, cultured dextrose, and buffered vinegar against coliforms in Fresh Ground Turkey
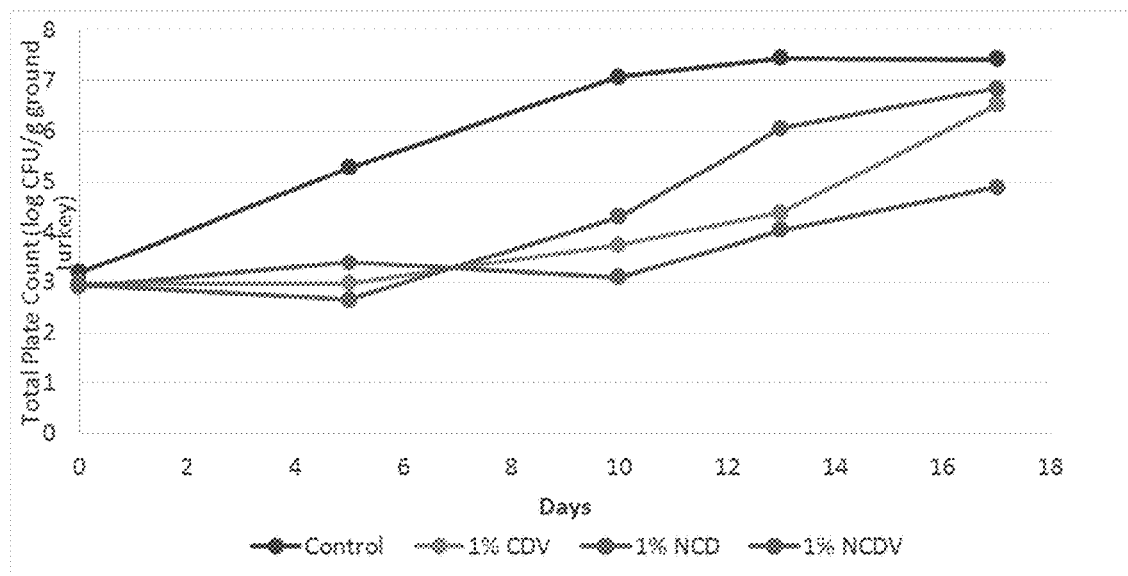
Figure 9. Synergistic antimicrobial activity of dried rosemary extract, cultured dextrose, and buffered vinegar against total aerobic bacteria in Fresh Ground Turkey

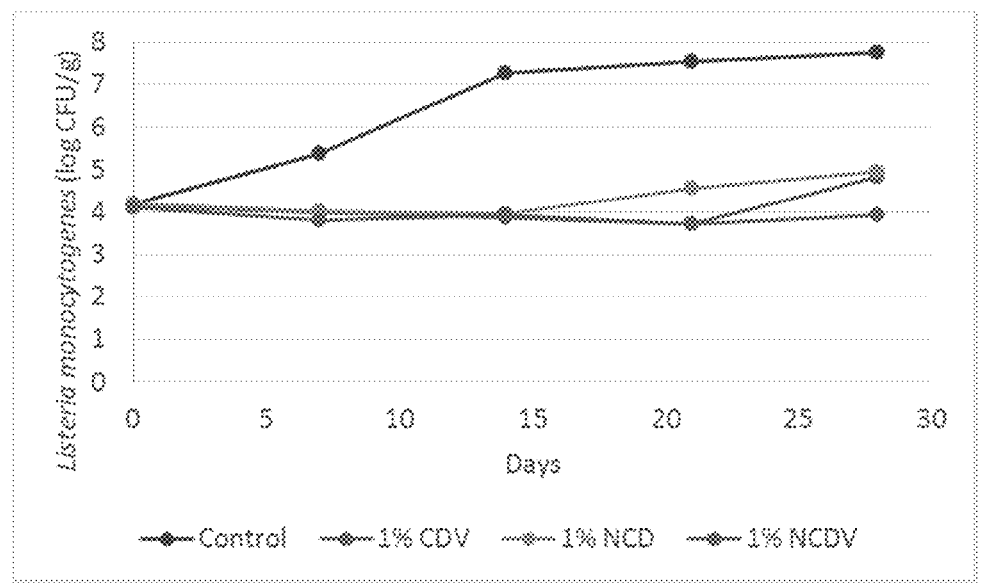
Figure 10. Synergistic antimicrobial activity of dried rosemary extract, cultured dextrose, and buffered vinegar against Listeria in chicken salad

SYNERGISTIC ANTIMICROBIAL EFFECTS AMONG ROSEMARY EXTRACT, CULTURED DEXTROSE AND BUFFERED VINEGAR

FIELD OF THE INVENTION

The present invention relates to antimicrobial processes and to novel antimicrobial compositions which may be employed in such processes. In search of a novel and powerful "clean-label" antimicrobial solution, three distinct classes of antimicrobials including plant extracts (such as plant essential oils), cultured dextrose, and buffered vinegar were tested for synergistic antimicrobial effects. Surprising synergies were observed when rosemary extract or rosemary essential oil, cultured dextrose, and buffered vinegar were combined. Combinations of two and/or three of these antimicrobials all showed synergistic antimicrobial effect against *Salmonella entericia* subsp. *enterica* serovar *typhimurium*.

BACKGROUND OF THE INVENTION

Chemical preservatives in combination with various processing aids have been traditionally applied to food systems to prevent food spoilage microorganisms or foodborne pathogens. However, an increasing demand toward natural and additive-free food products from consumers prompted the food industry to seek effective "clean label" antimicrobial solutions which maintain safety and stability of the food products.

Cultured dextrose is a commercially available food additive produced by fermentation of sugar sources such as corn, cane sugar, or dairy based sources including skim milk. The cultured dextrose is composed of various fermentation metabolites where the main active components are antimicrobial peptides and organic acids. The microorganisms involved in the fermentation are mainly probiotic bacteria, such as propionic acid (including *Propionibacterium freudenreichii*) and lactic acid bacteria (including *Lactococcus lactis*). The main application of cultured dextrose is to inhibit the growth of bacteria, yeast, and mold in food systems. Cultured dextrose could be an effective preservative in various applications including dairy, baked goods, or culinary products. However, the product often imparts savory notes to the product when used in effective dosages.

The increased evidences that plant materials have a potential for antimicrobial activity led researchers to study different extracts to inhibit bacteria, yeasts, and molds in various applications. Plant secondary metabolites are natural compounds that are known for their plant defense mechanisms and possess multiple biological activities including antimicrobial effects. They include alkaloids, flavonoids, tannins, terpenes, quinones, and resins. One of the major limitations for using plant extracts as an antimicrobial agent in the food and feed industry is that the plant extracts often require high effective dosage and thus negatively impacts the organoleptic property of the applied matrices.

Essential oils are mixture of volatile compounds extracted from plant biomass and have been identified as natural antimicrobial agents where the activity is mainly understood to arise from phenolic components. However, the usage of essential oils as a food preservative is limited due to the high flavor profile, which flavor profile negatively impacts the organoleptic property of the applied food.

Buffered vinegar is another "clean label" alternative for chemical preservatives in the current food industry, especially for meat and poultry. Buffered vinegar is known to inhibit the growth of foodborne pathogens as well as common spoilage organisms. The taste impact of vinegar may be reduced by buffering the vinegar with sodium or potassium based alkalis. However, the concentration of buffered vinegar required to exhibit antimicrobial activity often imparts "vinegar" or "acidic" notes in the final products and negatively impacts the organoleptic property.

The current invention identifies synergistic combinations which could effectively suppress the growth of spoilage microorganisms or pathogens at lower concentrations and thereby diminish the associated flavor impact of the constituent antimicrobials. These synergistic combinations find application in meat and poultry, sauces and dressings, salads, hummus, seafood, cosmetics and/or nutritional supplements.

OBJECT OF THE INVENTION

It is an object of the present invention to provide novel synergistic compositions comprising known "clean-label" antimicrobial substances as well as processes for stabilizing food substances against typical food borne spoilage microorganisms and/or pathogens. The present synergistic composition and process is designed to replace current synthetic antimicrobials and processes which utilize synthetic antimicrobials, such as sodium diacetate, potassium lactate, and sodium benzoate. It is a further object of the invention to provide novel combinations of "clean label" antimicrobials which may be employed in such a process.

SUMMARY OF THE INVENTION

The present invention relates to antimicrobial compositions comprising at least two antimicrobial constituents selected from the group consisting of plant extracts (including plant essential oils), cultured dextrose and buffered vinegars, wherein the composition exhibits synergistic antimicrobial activity.

A further aspect of the invention relates to such an antimicrobial composition wherein the plant extract constituent is a rosemary extract.

A further aspect of the invention relates to such an antimicrobial composition wherein the rosemary extract is a deflavorized rosemary extract low in essential oil (for example, in the range of 0.06-0.63% w/w).

A further aspect of the invention relates to such an antimicrobial composition wherein the plant extract constituent is a plant essential oil.

A further aspect of the invention relates to such an antimicrobial composition wherein the plant essential oil constituent is rosemary essential oil.

A further aspect of the invention relates to such an antimicrobial composition wherein the cultured dextrose constituent is a fermentation product of sugar sources such as corn, cane sugar, or dairy based sources including skim milk.

A further aspect of the invention relates to such an antimicrobial composition wherein the buffered vinegar constituent is a fermentation product of corn and cane sugar, but may also be applied to general vinegar compounds having acetic acid as a main component.

In an embodiment, the buffered vinegar constituent is selected from general vinegar compounds having acetic acid as a main component.

An embodiment antimicrobial composition comprises rosemary extract and cultured dextrose.

An embodiment antimicrobial composition comprises rosemary extract and buffered vinegar.

An embodiment antimicrobial composition comprises rosemary essential oil and cultured dextrose.

An embodiment antimicrobial composition comprises rosemary essential oil and buffered vinegar.

An embodiment antimicrobial composition comprises cultured dextrose and buffered vinegar.

An embodiment antimicrobial composition comprises rosemary extract, cultured dextrose and buffered vinegar.

An embodiment antimicrobial composition comprises rosemary essential oil, cultured dextrose and buffered vinegar.

A further aspect of the invention relates to a stabilized food, beverage, cosmetic and/or nutritional supplement comprising the antimicrobial composition.

A further aspect of the invention relates to a method for stabilizing foods, beverages, cosmetics and/or nutritional supplements comprising incorporating an effective amount of the antimicrobial composition, wherein the composition exhibits synergistic antimicrobial activity.

In an embodiment of the method, the antimicrobial composition comprises two antimicrobial constituents.

In an embodiment of the method, the antimicrobial composition comprises three antimicrobial constituents.

BRIEF DESCRIPTION OF THE DRAWINGS

FIG. 1 shows antimicrobial testing of rosemary essential oil (RO) and cultured dextrose (CD).

FIG. 2 shows antimicrobial testing of rosemary essential oil (RO) and buffered vinegar (BV).

FIG. 3 shows antimicrobial testing of cultured dextrose (CD) and buffered vinegar (BV).

FIG. 4 shows antimicrobial testing of rosemary essential oil (RO), cultured dextrose (CD) and buffered vinegar (BV).

FIG. 5 shows antimicrobial testing of A) rosemary essential oil (RO), cultured dextrose (CD), and the combination of RO and CD; B) rosemary essential oil (RO), buffered vinegar (BV), and the combination of RO and BV; and C) cultured dextrose (CD), buffered vinegar (BV), and the combination of CD and BV.

FIG. 6 shows antimicrobial testing of A) buffered vinegar (BV) and pimento leaf oil (PO); B) cultured dextrose (CD) and clove oil (CO); and C) cultured dextrose (CD) and thyme oil (TO).

FIG. 7 shows the synergistic antimicrobial activity of encapsulated rosemary essential oil, cultured dextrose, and buffered vinegar against *Salmonella* cocktail in Fresh Ground Turkey.

FIG. 8 shows the Synergistic antimicrobial activity of encapsulated rosemary essential oil, cultured dextrose, and buffered vinegar against coliforms in Fresh Ground Turkey.

FIG. 9 shows the Synergistic antimicrobial activity of dried rosemary extract, cultured dextrose, and buffered vinegar against total aerobic bacteria in Fresh Ground Turkey.

FIG. 10 shows the synergistic antimicrobial activity of dried rosemary extract, cultured dextrose, and buffered vinegar against *Listeria* in chicken salad.

DETAILED DESCRIPTION OF THE INVENTION

Microbial Strains and Culture Conditions

*Salmonella enterica* serovar *typhimurium* (ATCC® 14028™) was obtained from ATCC (Manassas, Va.). Alternatively, lactic acid bacteria including *Propionibacterium* spp., *Lactococcus lactis*, *Lactobacillus reuteri*, may be used in the assay as representative microbial sources. Brain heart infusion broth (BD, Sparks, Md.) was used as a growth medium and the pH was adjusted to pH 5.2 with HCl. Chloramphenicol (Sigma, St. Louis, Mo.) was used as a positive control. All cultures were incubated at 37° C. with agitation at 220 rpm for 24 hours. Growth was determined by measuring the optical density at 600 nm ($OD_{600}$) with BIOTEK PowerWave HT 340 spectrophotometer (BIOTEK, Winooski, Vt.). Delta growth was calculated by subtracting the growth measured at 0 hours from the growth measured at 24 hours.

Cultured Dextrose is prepared by fermentation of corn sugar or cane sugar or alternative sugar sources.

Buffered Vinegar is prepared by the fermentation of corn and cane sugar, but may also be applied to general vinegar compounds having acetic acid as main component.

Antimicrobial Synergy Determination

Percentage inhibition was calculated by the following equation:

$$\text{Percentage inhibition } (\%) = \frac{\text{Delta growth (growth control)} - \text{Delta growth (treatment)}}{\text{Delta growth (growth control)}} \times 100$$

All experiments were performed in triplicate.

Test for Two-Way Synergy

Rosemary essential oil (RO), buffered vinegar (BV), and cultured dextrose (CD) was tested for synergistic antimicrobial activity against *S. typhimurium*. Prior to synergy testing, minimum inhibitory concentration (MIC) of each compound was determined. The concentrations showing sub-inhibitory or no inhibitory effect were used for synergy test.

Two-way synergy was determined by the following equations:

Percentage inhibition of [$a$% rosemary essential oil and $b$% cultured dextrose mix]>Percentage inhibition of [$a$% rosemary essential oil]+Percentage inhibition of [$b$% cultured dextrose]

Percentage inhibition of [$a$% rosemary essential oil and $c$% buffered vinegar mix]>Percentage inhibition of [$a$% rosemary essential oil]+Percentage inhibition of [$c$% buffered vinegar]

Percentage inhibition of [$b$% cultured dextrose and $c$% buffered vinegar mix]>Percentage inhibition of [$b$% cultured dextrose]+Percentage inhibition of [$c$% buffered vinegar]

Test for Three-Way Synergy

The concentration of rosemary essential oil, buffered vinegar, and cultured dextrose used for the three-way synergy test was designed to have slight synergistic antimicrobial effects when two agents were combined, but not showing 100% inhibition against *S. typhimurium*.

Three-way synergy was determined when all of the following conditions were met:

Percentage inhibition of [$a$% rosemary essential oil and $b$% cultured dextrose and $c$% buffered vinegar mix]>Percentage inhibition of [$a$% rosemary essential oil]+Percentage inhibition of [$b$% cultured dextrose]+Percentage inhibition of [$c$% buffered vinegar]

Percentage inhibition of [$a$% rosemary essential oil and $b$% cultured dextrose and $c$% buffered vinegar mix]>Percentage inhibition of [$a$% rosemary essential oil and b% cultured dextrose mix]+Percentage inhibition of [c% buffered vinegar]

Percentage inhibition of [a% rosemary essential oil and b% cultured dextrose and c% buffered vinegar mix]>Percentage inhibition of [a% rosemary essential oil and c% buffered vinegar mix]+Percentage inhibition of [b% cultured dextrose]

Percentage inhibition of [a% rosemary essential oil and b% cultured dextrose and c% buffered vinegar mix]>Percentage inhibition of [b% cultured dextrose and c% buffered vinegar mix]+ Percentage inhibition of [a% rosemary essential oil]

Antimicrobial Testing in Food Models
Microbial Strains and Culture Conditions

*Salmonella enterica* subsp. *enterica* serovar *typhimurium* (ATCC® 14028™) *Salmonella enterica* subsp. *enterica* serovar *typhimurium* (ATCC® 700720™) *Salmonella enterica* subsp. *enterica* serovar *Enteritidis* (ATCC® 4931™), *Salmonella enterica* subsp. *enterica* serovar Newport (ATCC® 6962™) were obtained from ATCC (Manassas, Va.). Strains were initially grown in Brain heart infusion broth (BD, Sparks, Md.) at 37° C. with agitation at 220 rpm for 24 hours before inoculating in food matrices. All 4 strains of *Salmonella* were individually grown and then combined as a cocktail prior to inoculation.

*Listeria monocytogenes* ATCC® 19115™, *Listeria monocytogenes* ATCC® 19115™, *Listeria monocytogenes* ATCC® 19115™ were obtained from ATCC (Manassas, Va.). Strains were initially grown in Brain heart infusion broth (BD, Sparks, Md.) at 37° C. with agitation at 220 rpm for 24 hours before inoculating in food matrices. All 3 strains of *Listeria monocytogenes* were individually grown and then combined as a cocktail prior to inoculation.

Ground Turkey Model Preparation (for *Salmonella* and Coliforms Challenge Test)

Fresh ground turkey (80% lean and 20% fat) was purchased from a local store and transferred immediately to the laboratory. Ground turkey was coarsely ground (16 mm) and then finely ground (5 mm). Antimicrobial compounds were directly added to the ground turkey in a sterile stomacher bag and homogenized twice for 1 min at 230 rpm using stomacher (Seward Stomacher 400 Circulator).

Chicken Salad Model Preparation (for *Listeria* Challenge Test)

Fresh chicken breast, celery, mayonnaise, table salt, black pepper were purchased from a local store and transferred to the laboratory. Chicken breast was boiled in hot water until the internal temperature reached 74° C. and cut into 2 cm cubes. Celery was washed under cool water and dried and cut into 1 cm pieces. Chicken salad model was made by mixing 1640 g of cooked chicken cube, 105 g of celery, 180 g of mayonnaise, 2 g of black pepper, and 10 g of table salt. Antimicrobial compounds were directly added to chicken salad in a sterile stomacher bag and homogenized twice for 1 min at 230 rpm using stomacher (Seward Stomacher 400 Circulator).

Microbial Sampling

Food samples (25 grams) were transferred to a sterile stomacher bag and filled up with 0.1% peptone water to 250 grams. The mixtures were homogenized for 1 min at 230 rpm and serial dilution was performed to appropriate level and the diluents were plated on selective agar medium followed by 24 hours incubation at 37° C. For enumerating *Salmonella*, sample diluents were plated on XLD (Xylose Lysine Deoxycholate) agar medium and the red colonies with black center were counted. Yellow colonies appearing on XLD agar are gram-negative and lysine decarboxylase-negative bacteria and were considered as coliforms. Total plate count was determined by plating the samples on Total Plate Count (TPC) agar and incubating at 30° C. for 24 hours. *Listeria monocytogenes* count was determined by plating samples on *Listeria* selective agar (LSA) and incubating at 37° C. for 24 to 48 hours.

EXAMPLES

The following examples illustrate the invention without limiting its scope.

Example 1—Two-Way Synergy Between Rosemary Essential Oil and Cultured Dextrose

*Salmonella enterica* serovar *typhimurium* (ATCC® 14028™) was cultured at 37° C. with agitation at 220 rpm for 24 hours with brain heart infusion broth as a growth medium and the pH was adjusted to pH 5.2 with HCl. Chloramphenicol was used as a positive control. Growth was determined by measuring the optical density at 600 nm. Delta growth was calculated by subtracting the growth measured at 0 hours from the growth measured at 24 hours. Test antimicrobials and their percent inhibition were provided as noted below and in FIG. 1:

| Test Substance | Concentration (%) | Inhibition (%) |
| --- | --- | --- |
| Chloramphenicol | 0.02 | 97 |
| Rosemary Essential Oil | 0.50 | 9 |
| Cultured Dextrose | 0.16 | 0 |
| Rosemary Essential Oil + Cultured Dextrose | 0.5 0.16 | 98 |

Example 2—Two-Way Synergy Between Rosemary Essential Oil and Buffered Vinegar

*Salmonella enterica* serovar *typhimurium* (ATCC® 14028™) was cultured at 37° C. with agitation at 220 rpm for 24 hours with brain heart infusion broth as a growth medium and the pH was adjusted to pH 5.2 with HCl. Chloramphenicol was used as a positive control. Growth was determined by measuring the optical density at 600 nm. Delta growth was calculated by subtracting the growth measured at 0 hours from the growth measured at 24 hours. Test antimicrobials and their percent inhibition were provided as noted below and in FIG. 2:

| Test Substance | Concentration (%) | Inhibition (%) |
| --- | --- | --- |
| Chloramphenicol | 0.02 | 99 |
| Rosemary Essential Oil | 0.50 | 0 |
| Buffered Vinegar | 0.0625 | 1 |
| Rosemary Essential Oil + Buffered Vinegar | 0.5 0.0625 | 55 |

Example 3—Two-Way Synergy Between Cultured Dextrose and Buffered Vinegar

*Salmonella enterica* serovar *typhimurium* (ATCC® 14028™) was cultured at 37° C. with agitation at 220 rpm for 24 hours with brain heart infusion broth as a growth medium and the pH was adjusted to pH 5.2 with HCl. Chloramphenicol was used as a positive control. Growth was determined by measuring the optical density at 600 nm. Delta growth was calculated by subtracting the growth measured at 0 hours from the growth measured at 24 hours. Test antimicrobials and their percent inhibition were provided as noted below and in FIG. 3:

| Test Substance | Concentration (%) | Inhibition (%) |
| --- | --- | --- |
| Chloramphenicol | 0.02 | 98 |
| Cultured Dextrose | 0.16 | 3 |
| Buffered Vinegar | 0.0625 | 0 |
| Cultured Dextrose + Buffered Vinegar | 0.16 0.0625 | 100 |

Example 4—Three-Way Synergy Among Rosemary Essential Oil, Cultured Dextrose, and Buffered Vinegar In an effort to evaluate the potential for three-way synergy among the respective antimicrobial test substances, the concentration of such substances was reduced and three-way synergy was compared with two-way synergy among the test antimicrobials utilizing the reduced concentration. *Salmonella enterica* serovar *typhimurium* (ATCC® 14028™) was cultured at 37° C. with agitation at 220 rpm for 24 hours with brain heart infusion broth as a growth medium and the pH was adjusted to pH 5.2 with HCl. Chloramphenicol was used as a positive control. Growth was determined by measuring the optical density at 600 nm. Delta growth was calculated by subtracting the growth measured at 0 hours from the growth measured at 24 hours. Test antimicrobials and their percent inhibition were provided as noted below and in FIGS. 4 and 5:

| Test Substance | Concentration (%) | Inhibition (%) |
| --- | --- | --- |
| Chloramphenicol | 0.02 | 99 |
| Rosemary Essential Oil | 0.50 | 0 |
| Cultured Dextrose | 0.112 | 0 |
| Buffered Vinegar | 0.044 | 0 |
| Rosemary Essential Oil + Cultured Dextrose + Buffered Vinegar | 0.5 0.112 0.044 | 100 |
| Rosemary Essential Oil + Cultured Dextrose | 0.5 0.112 | 22 |
| Rosemary Essential Oil + Buffered Vinegar | 0.5 0.044 | 24 |
| Cultured Dextrose + Buffered Vinegar | 0.112 0.044 | 64 |

Example 5—Two-Way Synergy Among Various Essential Oils in Combination with Cultured Dextrose, and Buffered Vinegar In an effort to evaluate the potential for synergy among the respective antimicrobial test substances and various other essential oils selected from clove, thyme and pimento leaf, sub-inhibitory concentrations of the additional essential oil extracts were evaluated singly and in combination with cultured dextrose and buffered vinegar. As the essential oils under evaluation demonstrated antagonistic or non-synergistic effects over the inhibition observed with cultured dextrose and buffered vinegar, the concentration of the cultured dextrose and buffered vinegar was increased over the sub-inhibitory concentrations utilized in the three-way synergy experiments with rosemary essential oil. *Salmonella enterica* serovar *typhimurium* (ATCC® 14028™) was cultured at 37° C. with agitation at 220 rpm for 24 hours with brain heart infusion broth as a growth medium and the pH was adjusted to pH 5.2 with HCl. Chloramphenicol was used as a positive control. Growth was determined by measuring the optical density at 600 nm. Delta growth was calculated by subtracting the growth measured at 0 hours from the growth measured at 24 hours. Test antimicrobials and their percent inhibition were provided as noted below and in FIG. 6:

| Test Substance | Concentration (%) | Inhibition (%) |
| --- | --- | --- |
| Chloramphenicol | 0.02 | 100 |
| Cultured Dextrose | 0.2 | 90 |
| Buffered Vinegar | 0.065 | 26 |
| Clove Essential Oil | 0.025 | 53 |
| Clove Essential Oil + Cultured Dextrose | 0.025 0.2 | 92 |
| Thyme Essential Oil | 0.03 | 47 |
| Thyme Essential Oil + Cultured Dextrose | 0.03 0.2 | 91 |
| Pimento Leaf Oil | 0.05 | 14 |
| Pimento Leaf Oil + Buffered Vinegar | 0.05 0.065 | 32 |

Example 6—Synergistic Antimicrobial Activity of Encapsulated Rosemary Essential Oil, Cultured Dextrose, and Buffered Vinegar Against *Salmonella* Cocktail and Coliforms in Fresh Ground Turkey

*Salmonella enterica* subsp. *enterica* serovar *typhimurium* (ATCC® 14028™) *Salmonella enterica* subsp. *enterica* serovar *typhimurium* (ATCC® 700720™) *Salmonella enterica* subsp. *enterica* serovar *Enteritidis* (ATCC® 4931™), *Salmonella enterica* subsp. *enterica* serovar Newport (ATCC® 6962™) were individually cultured in Brain heart infusion broth (BD, Sparks, Md.) at 37° C. with agitation at 220 rpm for 24 hours and then combined as a cocktail. Fresh ground turkey was prepared and mixed with each antimicrobial treatment: 1) control treatment with no antimicrobial added (control), 2) 0.3% cultured dextrose and buffered vinegar blend mixed at 50:50 ratio (0.3% CDV), 3) 5% encapsulated rosemary essential oil with 20% loading yield (5% RO), and 4) 0.3% CDV+5% RO. After the addition of antimicrobial treatments, *Salmonella* cocktail was inoculated to the ground turkey with a target initial population around 4 log CFU/g. Ground turkey samples were then vacuum packaged and stored at 10° C. for 14 days period and checked for *Salmonella* population by plating the samples on XLD agar media and counting the red colonies with black centers. Yellow colonies appearing on XLD agar are gram-negative and lysine decarboxylase-negative bacteria and were considered as coliforms. All experiments were performed in duplicate, and the average value is reported.

The ground turkey treated with 0.3% CDV+5% RO showed the best result by inhibiting the growth of *Salmonella* very effectively compared to the other treatment groups. The results are shown in FIG. 7. A bactericidal effect (decrease in *Salmonella* counts) was observed when comparing day 14 (3.1 log CFU/g) to day 0 (3.8 log CFU/g).

Especially in day 4, the rosemary oil alone (5% RO) did not show any inhibitory effect against *Salmonella*, but when rosemary oil was combined with cultured dextrose and buffered vinegar, a clear synergistic antimicrobial effect was observed.

The combination of cultured dextrose, buffered vinegar, and encapsulated rosemary essential oil also performed the best and showed synergistic antimicrobial effect against coliforms. The results are shown in FIG. 8.

Example 7—Synergistic Antimicrobial Activity of Dried Rosemary Extract, Cultured Dextrose, and Buffered Vinegar Against Spoilage Microorganisms in Fresh Ground Turkey Fresh Ground Turkey (80% lean and 20% fat) was coarsely ground (16 mm) and then finely ground (5 mm) and mixed with each antimicrobial treatment: 1) control treatment with no antimicrobial added (control), 2) 1% cultured dextrose and buffered vinegar blend mixed at 50:50 ratio (CDV), 3) 1% blend of 2.2% dried rosemary extract, 85% cultured dextrose, 13.85% Maltodextrin and 0.7% Silica (NCD), and 4) 1% blend of 2.2% dried rosemary extract, 50% Cultured Dextrose, 35% buffered vinegar, 13.85% Maltodextrin, and 0.7% Silica (1% NCDV). Ground turkey samples were then vacuum packaged and stored at 4° C. for a 17 day period and checked for total plate count by plating the samples on Total Plate Count (TPC) agar. All the experiments were performed in duplicate, and the average value is reported.

1% NCD was the most effective antimicrobial agent for inhibiting total aerobic bacteria. Although the average value of the 1% NCD treatment showed slight increase of total plate count at day 5 compared to day 0, the difference were not statistically significant. The ground turkey treated with a combination of NCD was more effective in inhibiting the growth of total aerobic bacteria compared to the CDV without the rosemary extract (FIG. 9) showing 1.6 log differences at day 17. On the other hand, NCD treatment did not perform well compared to the other two treatments.

When dried rosemary extract was used alone at the same concentration (2.2%), there were no antimicrobial activity observed (data not shown) proving that the combined effect was synergistic.

To identify which microorganisms were inhibited by the additional synergistic effect with the addition of dried rosemary extract in the synergistic combination, the colonies that grow on the TPC agar from 1% CDV treated ground turkey sample but not from the 1% NCDV treated sample were isolated and identified by 16s rRNA sequencing. All the colonies isolated were identified as *Pseudomonas* spp.

Example 8—Synergistic Antimicrobial Activity of Dried Rosemary Extract, Cultured Dextrose, and Buffered Vinegar Against *Listeria monocytogenes* in Chicken Salad

*Listeria monocytogenes* ATCC® 19115™, *Listeria monocytogenes* ATCC® 19115™, *Listeria monocytogenes* ATCC® 19115™ were obtained from ATCC (Manassas, Va.). Strains were initially grown in Brain heart infusion broth (BD, Sparks, Md.) at 37° C. with agitation at 220 rpm for 24 hours before inoculating in food matrices. All 3 strains of *Listeria monocytogenes* were individually grown and then combined as a cocktail. Chicken salad was prepared and mixed with each antimicrobial treatment: 1) control treatment with no antimicrobial added (control), 2) 1% cultured dextrose and buffered vinegar blend mixed at 50:50 ratio (CDV), 3) 1% blend of 2.2% dried rosemary extract, 85% cultured dextrose, 13.85% Maltodextrin and 0.7% Silica (NCD), and 4) 1% blend of 2.2% dried rosemary extract, 50% Cultured Dextrose, 35% buffered vinegar, 13.85% Maltodextrin, and 0.7% Silica (1% NCDV). After the addition of antimicrobial treatments, *Listeria* cocktail was inoculated to the chicken salad with a target initial population around 4 log CFU/g. Chicken salad samples were then stored at 4° C. for 28 days period and checked for *Listeria monocytogenes* population by plating the samples on LSA agar media and counting the black colonies. All the experiments were performed in duplicate, and the average value is reported.

The combination of dried rosemary extract, cultured dextrose, and buffered vinegar (NCDV) treatment performed better than the combination of culture dextrose and buffered vinegar (CDV) or the combination of dried rosemary extract and cultured dextrose (NCD). At day 21, 1% NCD had a higher *Listeria monocytogenes* count compared to the other two treatments and at day 28, 1% CDV and 1% NCD treatments had higher *Listeria monocytogenes* counts compared to 1% NCDV. When dried rosemary extract was used alone at the same concentration (2.2%), there were no antimicrobial activity observed (data not shown) proving that the combined effect was synergistic.

The present invention is not to be limited in scope by the specific embodiments described herein. Indeed, various modifications of the invention in addition to those described herein will become apparent to those skilled in the art from the foregoing description. Such modifications are intended to fall within the scope of the appended claims.

All patents, applications, publications, test methods, literature, and other materials cited herein are hereby incorporated by reference.

The invention claimed is:

1. An antimicrobial composition comprising rosemary essential oil, cultured dextrose and buffered vinegar, wherein the rosemary essential oil is present at a concentration of 0.5% or less, the cultured dextrose is present at a concentration of 0.112% or less, and the buffered vinegar is present at a concentration of 0.044% or less, and wherein the composition exhibits synergistic antimicrobial activity.

2. The antimicrobial composition of claim 1, wherein the cultured dextrose constituent is a fermentation product of sugar sources such as corn, cane sugar, or dairy based sources including skim milk.

3. The antimicrobial composition of claim 1, wherein the buffered vinegar constituent is a fermentation product of corn and cane sugar, but may also be applied to general vinegar compounds having acetic acid as a main component.

4. The antimicrobial composition of claim 1, wherein the buffered vinegar constituent is selected from general vinegar compounds having acetic acid as a main component.

5. A stabilized food, beverage, cosmetic and/or nutritional supplement comprising the antimicrobial composition of claim 1.

6. A method for stabilizing foods, beverages, cosmetics and/or nutritional supplements comprising incorporating an effective amount of the antimicrobial composition of claim 1, wherein the composition exhibits synergistic antimicrobial activity.

* * * * *